Oct. 9, 1951     J. F. KIRKBRIDE ET AL     2,570,818
TANK FILLER PIPE AND CLOSURE
Filed March 5, 1946
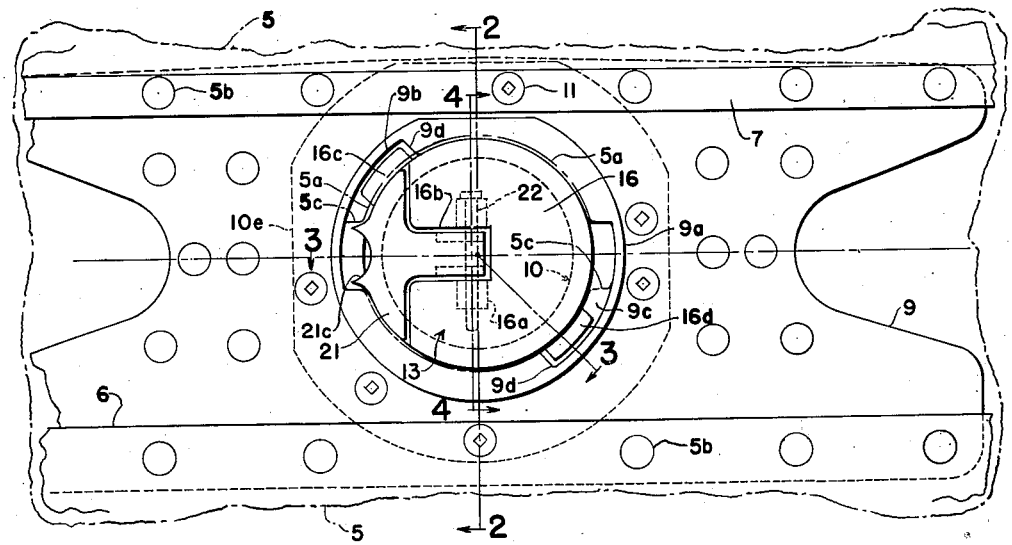
Fig. 1
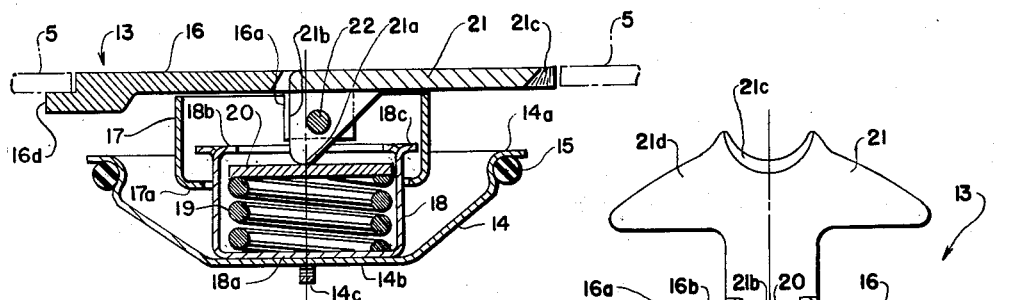
Fig. 3
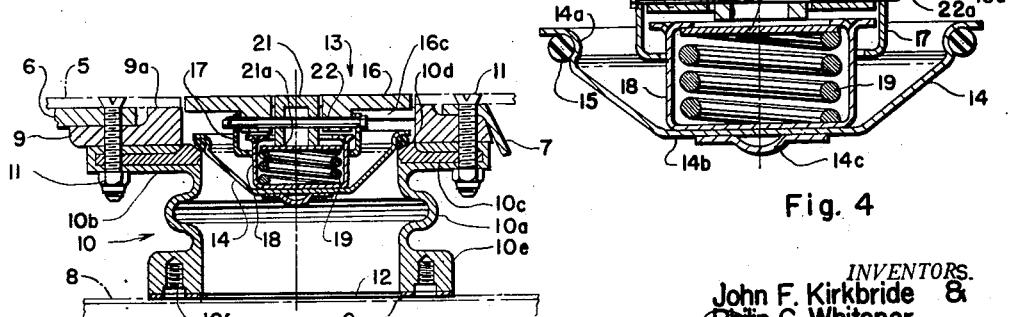
Fig. 2
Fig. 4
INVENTORS.
John F. Kirkbride &
Philip C. Whitener
BY
THEIR PATENT ATTORNEY Patented Oct. 9, 1951

2,570,818

UNITED STATES PATENT OFFICE 2,570,818

TANK FILLER PIPE AND CLOSURE

John F. Kirkbride and Philip C. Whitener, Seattle, Wash., assignors to Boeing Airplane Company, a corporation of Delaware Application March 5, 1946, Serial No. 652,114

14 Claims. (Cl. 220—40).

This invention relates to filler pipe and closure devices for tanks and like fluid containers and more particularly to such devices as used in aircraft and other vehicles.

In the operation of aircraft, as well as other vehicles of the land and water types, it is essential that ready access be provided to the tanks for fuel and other fluids in order that the contents may be quickly and efficiently replenished. It is also extremely desirable that suitable filler pipes and closure devices be provided for assuring such ready access to the tanks as well as for maintaining the same in a securely closed condition during the operation of the vehicle. The present invention is directed to improvements in such tank filler pipes and closures, to modifications of this invention which embody novel relationships of its component parts and a number of advantageous features contributing to its efficient use for vehicle containers.

It is accordingly a primary object of the present invention to provide an improved combined filler pipe and closure device having a novel and advantageous relationship of its respective parts. It is a further object to provide such a filler pipe and closure device which is simple, light in weight and of low cost to manufacture. A further object resides in the provision of such a device which is readily accessible and capable of being quickly installed within a vehicle in an operative relationship with its fluid container. Another objective is to provide such a device which is both positive and fool-proof in action and which will remain in its locked and sealed position under vibration and other severe service conditions.

It is a further object of the present invention to provide an improved filler pipe and closure device which is adapted for both flush and non-flush installations and which is further equipped with a filler pipe having a flexible portion which allows for variation in the spacing and misalignment of the openings of the tank and the covering of the vehicle in which it is installed. A further object resides in the provision of such a device having a sealing gasket to prevent leakage of the fluid or its evaporation, which sealing gasket is automatically placed and maintained under pressure in the installed position of the filler cap. A still further objective of the present invention embraces a novel handle arrangement for the installation and removal of the present closure cap, which handle is foldable for retraction in such a manner that it automatically compresses the sealing gasket, is retained in its closed position by spring pressure which is also exerted upon the gasket, and further serves as a lock to maintain the closure in its applied position.

Other objects and advantages of the present invention will become apparent to those skilled in the art after reading the present specification and the accompanying drawings forming a part hereof, in which:

Fig. 1 is a plan view of a portion of the wing surface to which the present filler pipe and closure is shown applied;

Fig. 2 is a cross-sectional view of the filler pipe and closure installation of Fig. 1 as taken along the lines 2—2 thereof;

Fig. 3 is a sectional view of the closure assembly as taken along the lines 3—3 of Fig. 1; and Fig. 4 is a cross-sectional view of the closure assembly as taken along the lines 4—4 of Fig. 1, but with the handle uplifted.

Referring now to Figs. 1 and 2, the broken lines indicated by the numeral 5 represent in phantom a portion of the skin covering of an airplane wing within which a submerged wing tank and the improved filler pipe and closure of the present invention is shown installed. It will, of course, be understood that the disclosed tank filler pipe and closure may be installed in other portions of an airplane such as in the fuselage, pontoons, and other component parts, as well as in other vehicles. While the installation shown in the drawings by way of example is of the flush type and is readily adapted to aerodynamic surfaces where resistance and turbulence is to be held to a minimum, the present device is equally applicable to installations which need not be perfectly flush. In Figures 1 and 2 the numeral 6 indicates the flange of a wing spar and 7 indicates a skin stiffening element extending in a spanwise direction substantially parallel to the spar 6. The upper surface of a wing fuel tank is indicated by the numeral 8 in Fig. 2, being submerged or spaced inwardly within the wing with respect to its upper skin covering 5.

A supporting plate fitting 9, preferably of a width sufficient to extend across the space between the spar flange 6 and the longitudinal stiffener 7, is positioned beneath the wing skin 5 and attached thereto as by the countersunk attachment screws 5b. The support member 9 has a circular upstanding central boss 9a within which are formed the bayonet slots or detents 9b and 9c open from above to the underside of the skin 5 and having ends 9d at the clockwise edges of the slots. A filler pipe, indicated by the numeral 10, is formed with a flexible crimp or fold 10a in its wall portion to permit of expansion and adjustment due to variations in the spacing between the surface of the tank and the bottom of the wing structure elements 6, 7 and 9, as well as any misalignment of the axis of the opening 5a in the skin and the opening 8a in the tank.

The filler pipe 10, preferably of flexible material, is provided with a flange 10b at its upper portion within which there is carried a metallic insert ring 10c having an exposed beveled seating surface 10d for engagement by a ring gasket of the valve closure to be described. The filler pipe or neck is also provided at its lower end with a thickened flange 10e within which are provided tapped holes or inserts 10f. The latter match similar holes in the flat gasket 12 through which suitable bolts are inserted for the attachment of the filler neck to the upper wall of the tank 8 through this intermediate gasket 12. The upper flange 10b of the filler pipe is fastened to the plate fitting 9, the wing structure 6 and 7, and the skin 5 by the countersunk head through bolts 11.

The closure cap assembly is indicated generally by the numeral 13 and includes an inner wall valve member 14, which is provided adjacent its upper periphery with a flange 14a forming a recessed seat for a rubber ring sealing gasket 15. The inner wall or valve element 14 is preferably made of sheet material in the form of a frustrum of a cone having a flat bottom portion 14b to which is preferably attached the bent strip 14c. The latter is provided with an eye portion to which a chain may be attached for the tethering of the closure assembly to a suitable attachment on the adjacent tank or filler pipe structure in order to prevent its loss while removed from the filler pipe. It will be noted that the gasket 15 is of circular cross-section and its diameter across the ring is such that it will bear against the abovementioned seating surface 10d of the metallic insert 10c of the filler pipe.

The partially circular top plate 16 has attached to its undersurface a cylindrical collar 17 which is internally flanged at its lower or inner end 17a. Coaxially disposed within the collar 17 is a cylindrical cup 18 of somewhat lesser outside diameter than the opening in the flange 17a, the cup 18 being welded or otherwise secured to the flat bottom portion 14b of the plug or valve member 14 through its end wall 18a. The cup 18 is also provided with both inwardly and outwardly flanged detent portions 18b and 18c, respectively, at its upper end in such manner that the outwardly turned detents 18c are of a greater diameter than the opening in the flange 17a of the collar 17 to thereby prevent separation of the collar and the telescoped cup while at the same time permitting free relative rotation and limited axial movements between these two cylindrical elements. Within the cup 18 there is housed a compression spring 19 which presses upwardly and outwardly against the circular plate or disc 20 which in turn bears against the handle 21 which is pivoted at 22 to the lug portions 16a of the cover plate 16. The latter is provided with a T-shaped opening 16b to receive the handle 21 in a flush complementary relationship when the handle has been rotated into its flush or retracted position about the pivot pin 22, as indicated in Figs. 1, 2 and 3.

The cover plate 16 is provided with a pair of diametrically opposite lugs or tongues 16c and 16d which extend outwardly in radial directions and are offset below the surface of the plate as shown in the section in Fig. 3. As may be seen in Fig. 1 the skin covering 5 is provided with a circular opening 5a of a slightly greater diameter than that of the cap plate 16, the opening having arcuate notched portions 5c into which the lugs 16c and 16d are adapted for insertion. The cap plate 16, together with its attached filler closure assembly, may then be rotated until the lugs or tongues 16c and 16d are moved through the bayonet slots 9b and 9c in the plate 9 until limited by engagement with the end walls 9d of the slots. The angular relationship of the lugs 16c and 16d with respect to the handle 21 is such that when the lugs reach the ends of the bayonet slots the tip portion 21c of the handle will be in the position in which it can be dropped into one of the slots 5c in the skin. This serves to lock the filler cap assembly from further rotation when the handle is down in its flush position.

The handle 21 is substantially T-shaped with bifurcated or lug portions 21a—b which are suitably apertured for the pin 22. The walls of the collar 17 are similarly apertured to receive the pin 22 which is retained by the cotter 22a. These lugs 21a—b are of a triangular shape each having a rounded toe portion 21a and a flat base portion 21b somewhat closer to the axis of the pivot pin 22, such that when the handle is in its down or flattened position the toe portion 21a causes the plate 20 to be pressed against the spring 19. In this position, as indicated in Fig. 3, the spring applies pressure upon the gasket 15 as well as to exert an eccentric force upon the handle about its pivot such that the handle is held down against inadvertent lifting. The opposite or outer end of the handle is provided with a pair of laterally extending wing portions 21d which facilitate its being manually rotated and is intermediately notched at 21c to facilitate lifting when engaged by the operator's finger or a suitable tool such as a screw driver. Upon being lifted into the position shown in Fig. 4 the flat base portion 21b of the handle is rotated into the position above the plate 20, but being closer to the axis of the pin 22 the plate is relieved of downward pressure and is forced upwardly by the compression spring 19 until it reaches its upper limits in engagement with the inner detent 18b of the cup 18 as shown in Fig. 4. In this position of the handle the pressure on the gasket 15 is accordingly relieved.

In order to insert the filler cap assembly into the filler neck unit the handle 21 should preferably be in this raised position projecting upwardly from the plate 16 in such manner that the flat surface 21b on the pivoted end of the handle will be opposite the plate 20 which retains the spring 19 in the cup 18. The spring 19 in this condition will consequently be in its position of maximum extension or expansion. The valve portion 14 is then moved inwardly through the opening 5a in the wing skin until the tongued lugs 16c and 16d pass through the notches 5c in the skin into a position in which the lugs are beneath the plane of the inner surface of the skin, and the upper surface of the top plate 16 is substantially flush with the skin outer surface. By turning the handle 21 in a clockwise direction these lugs may be moved along the bayonet slots 9b and 9c until they engage the end walls 9d of these slots. During this rotative movement sufficient force may be exerted upon the spring 19 by inward pressure of the handle 21 and the top plate 16 that the valve 14 and the gasket ring 15 will not rotate relative to the valve seat 10d. This prevents unnecessary scarring and wear of the engaging valve parts. In any event, when the plate 16 has been rotated to its limit position as determined by the end walls 9d of the detents or bayonet slots, the handle 21 can be swung downwardly into its retracted position flush with the top of plate 16 so that its swinging end 21c will engage in one of the wing skin notches 5c.

The action of swinging the free end 21c of the handle 21 into the notch in the wing skin simultaneously accomplishes a number of functions which contribute materially to the present invention. A first result of this rotation of the handle resides in the application of pressure by the toe portion 21a against the plate 20 in order to compress the spring 19. As indicated above, this toe portion is located with respect to the pivot 22 in such manner that the pressure of the spring will act eccentrically of the pivot axis to hold the handle down in its flush position against inadvertent lifting, although it can be readily raised by the insertion of a finger or a suitable tool into the depression 21c provided in the end of the handle.

A second result ensuing downward rotation of the handle resides in the fact that as the spring 19 is compressed it assists in forcing the cup 18 and the valve wall 14 away from the plate 16 and therefore presses the gasket 15 firmly against its seat 10d, this pressure reacting through the plate 16 and the lugs 16c and 16d against the under side of the wing skin 5. A third and further effect of the handle rotation is that inasmuch as the handle is held in its flush retracted position with its swinging end 21c engaged in the wing skin notch 5c the plate 16 to which it is pivoted cannot be rotated to release the lugs 16c and 16d from the bayonet slots 9b and 9c, therefore serving to lock the cap and filler assembly securely in its closed or engaged position.

The manner of attaching the cover plate 16 to the valve portion 14 in which unlimited relative rotation is permitted between these portions, and a relatively large resiliently-opposed axial movement is also permitted, has the effect of providing a unique flexible and resilient coupling between the cover plate and valve elements. It will also be noted that the cam portions of the pivoted lever 21 cooperate with this flexible coupling, as well as the valve and the cover plate, in providing a means for rotating the cover plate into its flush installed position while at the same time automatically insuring that the turning movement of the plate 16 is not transmitted to the valve portion 14, thereby eliminating unnecessary sliding and scoring of the elastic seal 15 on the seating surface 10d. In its downwardly turned flush position the handle 21 by engagement of its cam or toe portion with the plate 20 compresses the spring 19 to thereby axially separate the cover and valve elements, applying pressure against the seal ring 15, arresting any further relative rotation between the cover and valve elements and additionally locking itself within the arcuate slots in the skin 5, with which it cooperates to prevent any further rotational movement of the cover plate 16.

Other forms and modifications of the present invention, which may occur to one skilled in the art, as they may pertain either to the general arrangement or the details of its respective parts, are each intended to fall within the scope and spirit of this invention as defined in the appended claims.

We claim:

1. A tank filler and closure device comprising a filler pipe attached to the tank, said filler pipe having a valve seating surface, a closure assembly arranged for engagement with said seating surface, said closure assembly including a valve element, a cap plate, cylindrical telescoping means fixed to said valve element and to said cap plate arranged to provide relative axial and rotative movements therebetween, said cap plate having tongue portions engageable with detent means carried by the adjacent filler pipe, a pivoted lever rotatively carried by said cap plate, said lever having an angularly disposed offset cam portion and resilient means disposed within said telescoping means and interposed between said valve element and said lever cam portion arranged to extend said telescoping means to simultaneously maintain said lever in a rotated flush position and to maintain said valve element in a sealed relationship against said valve seating surface.

2. In a bayonet type filler cap and tank closure device, a valve portion adapted for engagement with a filler pipe opening, a cup-shaped element having inwardly and outwardly extending flange portions at its rim attached by a base portion to said valve element, a compression spring disposed within said cup-shaped element, a disc interposed between said compression spring and said inwardly extending flange portion of said cup-shaped element, a cover plate carrying bayonet-slot-engaging lugs, a collar element attached to the underside of said cover plate and having inwardly extending flange portions in a telescoping and surrounding relationship with respect to said cup-shaped element, a pivoted handle rotatively carried by said cover plate at a recessed portion thereof, said handle having a cam-shaped extension engageable, in a flush position of the handle with respect to said cover plate, with said spring-opposed disc for the increased reaction of said valve portion against said filler pipe opening.

3. A tank filler pipe and closure assembly comprising a flexible filler pipe having flanged ends attachable to a tank and to adjacent supporting structure, said filler pipe having a seating surface, a fitting element attached to the supporting structure having an aperture therethrough and adjacent bayonet slots facing said aperture, said closure assembly adapted to fit within said fitting element aperture and having a sealing surface engageable with the seating surface of said filler pipe, a cap element rotatively coupled to said closure assembly in an axially restrained relationship, said cap element provided with extending lug portions engageable with said bayonet slots in said fitting element said cap element having a recessed portion, and lever means pivotally associated with said cap element at said recessed portion, said lever portion having an eccentric portion engageable with said rotatively coupled closure assembly through said recessed portion arranged to resiliently urge the axial separation of said cap element and the sealing portions of said closure assembly for the locking of the cap element against said bayonet slots and the increased sealing of the closure assembly against the seating surface of said filler pipe.

4. In a filler pipe closure device, a valve element, a cylindrical cup element having its closed end wall attached to said valve element and having inwardly and outwardly extending flanged portions formed at its open end, a cylindrical collar element having an inwardly turned flange embracing the cylindrical wall portion of said cup element and having limited axial movement with respect thereto, a cover plate element having apertured lug portions spaced to fit within said cylindrical collar element, resilient means disposed within said cup element tending to axially separate the bottom thereof from said cover plate element, and pivotal means extending through the wall of said collar element and the apertures of said lug portions arranged for the flexible coupling of said cover plate element to said valve element whereby one is freely rotatable with respect to the other and resilient axial movements limited by engagement of the outwardly extending flanges of said cup element with the inwardly turned flanges of said collar element are permitted beween said cover plate and said valve element.

5. A filler pipe and closure device for an apertured wall element comprising an apertured member attached to said wall element, said apertured member having bayonet slots formed therein, said apertured member having a closure seating surface, a closure member adapted to engage said seating surface upon insertion through the aperture of said member, a cap element having its face substantially flush with the surface of said wall element, said cap element having an extensive and rotative coupling connected to said closure member and having lug portions engageable with the bayonet slots of said apertured member, a detent carried by said apertured member, and a handle pivotally mounted upon said cap element, said handle having a detent-engaging portion arranged to engage said detent to lock said cap element to said apertured member by engagement of its lug portion with said bayonet slots, said handle having a portion engaging and coupling to lock said closure member through extension of said coupling in the position of said closure member in engagement with the said seating surface.

6. In a tank closure device for a wall element, said wall element provided with an opening having opposed outwardly opening slotted portions, a filler cap assembly adapted to fit within said opening into a position in which it serves as a closure therefore, said filler cap assembly including a cover plate adapted to fill said wall element opening in a flush relationship, said cover plate carrying oppositely extending integral lugs arranged to engage said opposed slotted portions and handle means associated with said filler cap assembly arranged for the rotation of said cover plate to the position in which said lugs engage said slotted portions, said handle means having an extending detent portion, said handle means arranged for folding into a retracted position flush with said cover plate and said wall element in which said handle detent portion extends into one of said slotted portions and reverse rotation of said filler cap assembly with repect to said wall element and disengagement of said lugs and removal of said filler cap assembly.

7. A container filler device comprising a filler pipe having a seating surface, attachment means for fastening said filler pipe to a container, a structural fitting provided with bayonet slots surrounding a circular opening in the container, means for attaching said filler pipe to said fitting, a closure element adapted to engage the seating surface of said filler pipe in a sealed relationship, a cap element having extending lugs engageable with the said bayonet slots in said fitting, means coupling said closure and cap element arranged to provide relative axial and rotative movements therebetween, and handle means pivotally mounted upon said cap element, said handle means having an offset portion engaging said coupling means arranged for rotation to a position in which said cap element lugs engage said bayonet slots in said fitting for holding said cap element down against said fitting in a flush arrangement therewith, and in which position said closure and cap element are further axially separated through the extension of said coupling means for exerting additional pressure upon said sealing relationship of said closure with said seating surface.

8. In a filler pipe closure device of the type called for by claim 4 characterized by the inclusion of a handle member pivotally carried within a recessed portion of said cover plate element and having an eccentric offset portion arranged to engage said resilient means for increasing the separating effect of said resilient means in the position in which said handle means is rotated into a substantially flush relationship with said cover plate element.

9. In combination with a tank formed with a filler opening; a fixed assembly attached to the edges of said filler opening, said fixed assembly having a valve seat and detent means adjacent an outer face of said fixed assembly; a removable closure assembly having a closure portion arranged to engage said valve seat portion of said fixed assembly in a sealing relationship, a cover plate element having a recessed portion, handle means pivotally carried within the recessed portion of said cover plate, a cup element having its bottom portion attached to said closure portion and having its open end facing toward said cover plate element, axially telescoping means for flexibly connecting said cup element to said cover plate element, a compression spring disposed within said cup element, said handle means having an offset portion in engagement with a free terminal of said compression spring arranged upon rotation of said handle means from a position normal to said cover plate element to a position parallel therewith to increase the compression of said spring; detent means carried by the periphery of said cover plate element engaging the like means in said fixed assembly for locking engagement therewith in rotation in one direction of said cover plate element by said handle means in its upstanding position normal to the face of said cover plate element; said handle means having a projecting portion adapted to engage said detent means in said fixed assembly in the rotated flush position of said handle means to prevent rotation of said cap element in the reverse direction and removal of said movable assembly from said fixed assembly.

10. A closure assembly for an opening in a wall element comprising a fixed member attached to said wall element, said fixed member having bayonet slots formed therein adjacent said wall element opening, said fixed member having a closure seating surface, a movable closure member having a plug portion arranged to engage said seating surface of said fixed member for closing said opening through said wall element, a cap element having lug portions engageable with the bayonet slots of said fixed member, a flexible coupling interconnecting said cap element with said plug portion of said movable closure member, and a handle element pivotally mounted upon said cap element, said handle element having a projecting portion arranged to engage one of said bayonet slots formed within said fixed member, said handle element having an offset portions cammingly engageable upon rotation about said pivotal mounting with said flexible coupling in such manner that said handle element is folded into a retracted position flush with said cap element, said movable closure member is locked to said fixed assembly by engagement of said handle element with said detent in said fixed member and said flexible coupling is cammingly engaged by said offset portions such that said plug portion is forced into sealing engagement with the seating surface of said fixed member.

11. A closure assembly for a tank wall opening comprising a fixed member attached to said wall having opposed slotted portions, a closure member arranged to fit within said opening and said fixed member into a position in which it serves as a closure therefor, said closure assembly including a cover element arranged to fit within said tank wall opening, said cover element having oppositely extending lugs arranged to engage said slotted portions of said fixed member, a handle element pivotally mounted upon said cover element for facilitating the rotation of said cover element into a position in which the lugs of said cover element engage said fixed member slotted portions for locking said cover element to said fixed element, said handle element having an extended portion arranged upon folding of the handle element about said pivotal mounting into a retracted position with respect to said cover element such that said extended portion engages one of said slotted portions in said fixed member for preventing removal of said closure member from said fixed assembly by reverse rotation of said lugs from said slotted portions.

12. A closure and filler device for a container having an opening comprising: a fitting having a seating surface submerged from the surface of said container; attachment means for attaching said fitting to the container; said fitting provided with bayonet slots adjacent the opening in the container; a closure element adapted to engage the seating surface of said fitting in a sealed relationship therewith; a cap element having extending lugs engageable with the said bayonet slots in said fitting; means coupling said closure element and said cap element arranged to provide relative axial and rotative movements therebetween; and handle means pivotally mounted upon said cap element for rotation of said cap element to a position in which said cap element lugs engage said bayonet slots in said fitting for holding said cap element down against said fitting in a flush relationship therewith; said handle means having an offset portion engaging said coupling means arranged when said handle means is rotated about said pivotal mounting on said cap element to a flush retracted position to cause axial separation of said closure element from said cap element for exerting additional pressure upon sealing relationship of said closure element with said seating surface of said fitting.

13. A closure assembly for a tank opening fitting having a seating surface and closure detent means, comprising: a valve element arranged for engagement with said seating surface; a cap element having protruding portions engageable with the detent means of the fitting; flexible coupling means interconnecting said valve element with said cap element providing relative axial and rotational movements therebetween; a lever element pivotally carried by said cap element for increasing the closure pressure of said valve element upon said seating surface; said lever having an offset portion cammingly engageable with said flexible coupling means arranged in an extended position of the lever element to disengage said coupling means to relieve said seating surface pressure and permit approaching axial movement of said valve element toward said cap plate, and said lever element offset portion arranged, in a retracted position of said lever element in which said cap plate projecting portions are retained by the detent means of said fitting, to resiliently urge said valve element into its closed relationship with respect to said seating surface of the tank opening fitting by the engagement of said flexible coupling means by said lever element offset portions.

14. A closure for an opening in a container wall comprising a fixed seat member attached to an inner side of said wall, said fixed seat member having opposed slotted recesses opened to the outer side of said wall, said fixed seat member having a seating surface, a movable assembly arranged to fit within said opening and said fixed seat member in a position in which it serves as a flush closure therefore, said movable assembly including a plug portion arranged to fit in a sealed relationship with said seating surface of said fixed seat member, said movable assembly including a cover plate carrying oppositely extending lugs arranged to engage said opposed slotted recesses in said fixed seat member, flexible means interconnecting said cover plate with said plug portion permitting relative axial and rotational movements therebetween, a handle element pivotally associated with said movable assembly for facilitating the rotation of the said cover plate about the axis of said opening into a position in which said lugs engage said slotted recesses, said handle element having an offset cam portion engageable with said flexible coupling means arranged in such manner that pivotal folding of said handle element in a direction normal to the axis of said opening into a retracted position flush with said cover plate and said wall element, in which a portion of said handle element engages one of said slotted recesses, prevents reverse rotation of said movable assembly with respect to said fixed assembly about the axis of said opening and simultaneously urges said plug portion into sealing contact with the seat portion of said fixed seat member by the depressing effect of said cam portion of said handle element.

JOHN F. KIRKBRIDE.
PHILIP C. WHITENER.

REFERENCES CITED

The following references are of record in the file of this patent:

UNITED STATES PATENTS

| Number | Name | Date |
| --- | --- | --- |
| 1,369,754 | Nixon | Feb. 22, 1921 |
| 1,586,273 | Wall | May 25, 1926 |
| 1,756,976 | Ehlers | May 6, 1930 |
| 1,784,198 | Persson | Dec. 9, 1930 |
| 2,089,251 | De Frees | Aug. 10, 1937 |
| 2,316,507 | Dykeman | Apr. 13, 1943 |
| 2,351,526 | Lebus | June 13, 1944 |